United States Patent [19]
Froessl

[11] Patent Number: 4,726,065
[45] Date of Patent: Feb. 16, 1988

[54] IMAGE MANIPULATION BY SPEECH SIGNALS

[76] Inventor: Horst Froessl, GutenbergStrasse 2-4, 6944 Hemsbach, Fed. Rep. of Germany

[21] Appl. No.: 573,945

[22] Filed: Jan. 26, 1984

[51] Int. Cl.⁴ ............................................. G10L 1/00
[52] U.S. Cl. ..................................................... 381/41
[58] Field of Search .............................. 340/706–712; 364/188–192, 518, 521, 523, 200 MS File, 900 MS File; 382/7, 9, 57, 61; 381/41, 43, 44

[56] References Cited

U.S. PATENT DOCUMENTS

| | | | |
|---|---|---|---|
| Re. 32,012 | 10/1985 | Pirz et al. ............................ | 381/43 |
| 4,366,475 | 12/1982 | Kishi et al. ........................... | 340/731 |
| 4,521,870 | 6/1985 | Babbel et al. ........................ | 364/900 |
| 4,525,793 | 6/1985 | Stackhouse ............................ | 381/36 |
| 4,538,183 | 8/1985 | Kanno et al. ......................... | 364/523 |
| 4,553,261 | 11/1985 | Froessl ................................. | 364/188 |
| 4,555,775 | 11/1985 | Pike ....................................... | 340/734 |

*Primary Examiner*—Gareth D. Shaw
*Assistant Examiner*—John G. Mills
*Attorney, Agent, or Firm*—Walter C. Farley

[57] ABSTRACT

An improved method of entering instructions to a data processing system to modify the display includes voice recognition. In one embodiment the screen is divided into sectors and the memory supplying data bits to the display is functionally divided in a corresponding way. The operator utters sector identification and change instructions. Voice recognition apparatus provides recognized location information and instructions to an assembler from which commands are issued to the system. In another embodiment a touch responsive screen is used in conjunction with spoken instructions. The system is particularly useful in preparing material for microform storage.

8 Claims, 6 Drawing Figures

IMAGE MANIPULATION BY SPEECH SIGNALSSPECIFICATION

This invention relates to techniques for manipulating data and, in particular, to improved techniques by which a human operator can identify, modify and add to data in a processing system.

CROSS-REFERENCE TO RELATED APPLICATION

This application includes improvements to the system disclosed and claimed in my co-pending application Ser. No. 499,500, filed May 31, 1983, now U.S. Pat. No. 4,553,261, issued Nov. 12, 1985, the content of which is hereby incorporated by reference.

BACKGROUND OF THE INVENTION

Generally speaking, when one is interacting with a computer or computer terminal, instructions and data are input through a keyboard by the operator. Inputs can also be delivered, concurrently or not, by automatic readers, sensors, other computers and other kinds of machines and devices, but the human operator interface with the computer is by keystroke in a great majority of cases, aided in some special situations by a "mouse", lightpen or screen touch. This is not surprising because keystroke is the most efficient input for many situations. It provides a quick and relatively simple translation from human language and thought into either machine language or an intermediate code from which machine language can readily be derived by an assembler Disregarding the limited and special circumstances in which a lightpen, mouse or the like can be used, there are some disadvantages to the keyboard as an input device, especially as an exclusive input device in some situations. Among these are the rather obvious fact that a keyboard occupies the operator's hands, minimizing or eliminating their concurrent use for any other task. Use of the keyboard also requires some degree of training and familiarity with the key location and sequencing as well as some degree of manual dexterity, the necessary amount of skill, training and dexterity being functions of the task to be performed.

Exclusive use of the keyboard as an input device is particularly disadvantageous if the operator must sort through or refer to other documents or the like while interacting with the terminal. Additionally, it would be highly advantageous if an individual in a decision-making capacity could interact with the computer without dealing with the keyboard problem. Still further, certain forms of handicap make the keyboard an obstacle rather than a tool.

While direct voice input to processing machines has been considered and experimented with, it is often regarded as an impractical alternative to keystroke and as somewhat of a technical curiosity. Thus, while the technological capability exists, it is not used.

BRIEF SUMMARY OF THE INVENTION

Accordingly, it is an object of the present invention to provide advantageous methods of using the human voice as an input to a data processing machine for control as well as for limited data input purposes.

A further object is to employ the use of the voice as an input for data and instructions under those circumstances in which it is a faster and more efficient input technique than keystroke or other methods.

A further object is to provide a system in which the voice can be used as an input in conjunction with other input techniques such as touch screen.

Briefly described, the invention includes a method for using a voice input to a data processing machine of the type having a visual display screen and means for displaying selectable images on the screen, including the steps of providing a set of visible divisions on the screen which segregate the screen into sections which can be uniquely described by one or more alphanumeric symbols and providing a storage location for data bits from which a display is to be produced on the screen. The storage location is functionally divided into a plurality of storage portions at least equal in number to the number of sectors of the screen so that addresses in the storage location can be functionally correlated with image features displayed on the screen. A voice responsive transducer is provided for converting received utterances into electrical signals representative of speech patterns and a stored dictionary of speech patterns of a plurality of utterances is provided, the utterances including the alphanumeric symbols identifying the sectors and preselected instructions. The speech patterns of words received by the transducer are compared with the stored dictionary of patterns and outputs of recognized utterances are produced as either an instruction or a sector identification followed by an instruction, a match of patterns being defined as recognition of an utterance. Recognition is followed by execution of the received command relating to a particular sector, when a sector is specifically identified.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic block diagram of an apparatus incorporating the present invention;

FIGS. 2, 3, and 4 are diagrams illustrating the sector technique, in a simplified form, as employed in the invention;

FIG. 5 is a block flow diagram illustrating a known speech recognition technique; and FIG. 6 is a schematic block diagram illustrating a system including a further embodiment of the invention.

DETAILED DESCRIPTION OF PREFERRED EMBODIMENTS

Figure 1:
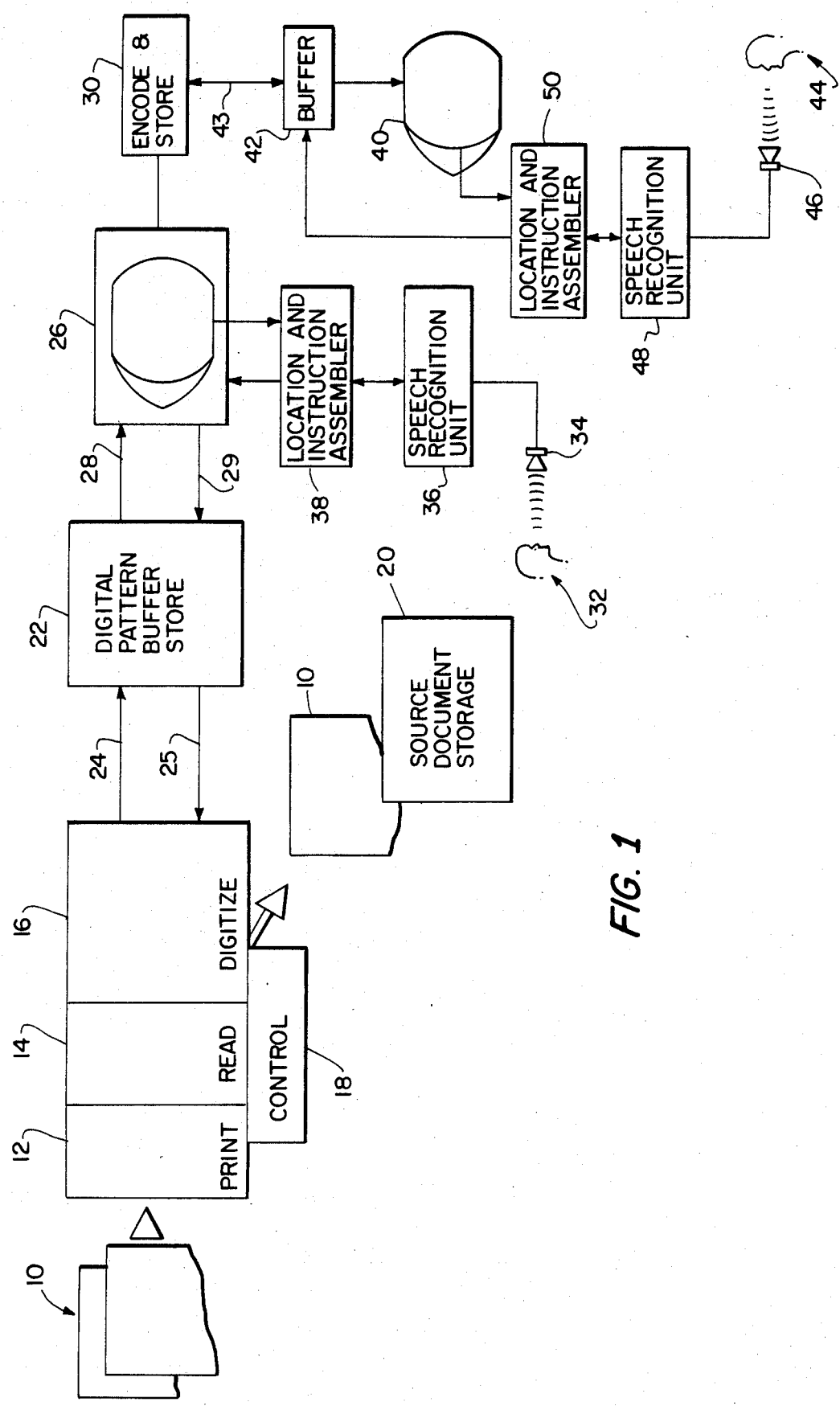

FIG. 1 illustrates a system in which the first portion is the same as that disclosed in previously mentioned U.S. Pat. No. 4,553,261. In that system, documents 10 are sequentially delivered to a printing device 12 in which they are marked with a unique identifying code. They are then supplied to a reader 14 which optically scans each document supplied to it. A digitizer 16 forms an integral part of the document reader and produces digitized signals representative of digital patterns approximating the characters and graphics which appear on source document 10. The printing, reading and digitizing functions are under the control of a control unit 18 which is normally supplied as an integral part of the reader and digitizer and which is easily adaptable to also control the printing function. After imprinting, reading and digitizing, the documents 10 are delivered to a source document storage location 20 where they are available for subsequent research, if necessary, but from which they would normally never be removed.

Digitizer 16 is in bidirectional communication with a digital pattern buffer store 22 on channels 24 and 25 which provide for data transfer and feedback regarding available storage space and other operating functions. The patterns stored in store 22 are supplied to a display unit 26 which can be a conventional CRT display, display unit 26 being in communication with store 22 on channels 28 and 29.

A primary purpose of this portion of the system, as explained in some detail as the previously identified application, is the presentation of the patterns from source documents 10, in a digitized form, on display 26 so that various forms of disposition of the documents can be determined and accomplished at that stage. A particular function is the selection of certain items of information from each source document or, if desired, the entire content of the source document, so that the patterns can be encoded in a standard digital code such as ASCII and stored in a mass digital store 30. For this purpose, it may be suitable for an individual to be positioned at a keyboard where display 26 can be observed, permitting the operator to position cursors to bracket and identify material to be saved, after which only that portion which has been selected will be encoded, the rest being eliminated from digital storage, thus making optimum use of the storage capacity.

There are, however, numerous other circumstances in which this direct relationship of a keyboard operator with a display is not the most efficient approach.

In accordance with the invention, the operator, indicated generally at 32, is supplied with a speech responsive transducer including a receiver 34, a speech recognition unit 36 and an assembler 38 which is connected to control certain functions of display 26. The speech recognition unit, which will be described in greater detail, is capable of receiving electrical speech signals produced by the microphone 34 from the acoustic utterances produced by the operator, the recognition unit being further capable of identifying certain utterances, within a defined lexicon, as being alphanumeric symbols and predetermined instructions. Utterances which are not recognized can simply produce a simple visual or audible indication of no recognition. Those which are recognized are delivered to assembler 38 in which they are implemented by causing display 26 to perform the instructed task.

An advantage of this system will be apparent by recognizing that the person reviewing the substance in documents 10 must make decisions about their disposition, commonly requiring reference to various other documents to identify individuals, locations and other information which will permit the decision-making process to be performed in an expeditious fashion. With a limited number of voice instructions, it is possible for an individual to have his or her hands free to accomplish these other tasks while issuing instructions to display 26 through the system described. As examples of simple commands, it is much quicker to center the display, if it is not centered, by simply saying "right", "up" or the like. Much more rapid movement of a cursor can be accomplished by commands such as "jump to" followed by a line or other identification of a position in the text.

This approach can also be employed to advantage by using the speech input in conjunction with other input or command devices. One of particular importance is the touch-screen systems which permit the operator to identify items depicted on the screen, or select locations thereon, by simply touching the item or location with a finger. The screen is made responsive to this touch by the provision of wires embedded in the screen structure or by infra-red sensors connected to the screen which respond to the operator's finger. The touch can, however, only perform an identification function; an instruction about what is to be done at the identified spot must be provided by some other technique. Voice input is especially useful in this regard, in conjunction with touch to provide instructions.

For example, if a sentence is to be selected for storage, the operator can touch the spaces before and after the sentence, issuing the instruction in conjunction with touching. If the sentence lies between points A and B, the sequence can be:

speak SELECT
touch A
touch B

The same basic approach can be used to select graphic images for encoding and storage or for other purposes. A particularly useful function of the overall system is the ability to rearrange the sequence of items. Assume, for example, that an order for a quantity of products is received, the order being in a format which has the data first, the customer's order number second, the customer's name third, the quantity fourth, the model number of the product fifth and the price sixth. The recipient, however, wishes to store the information in a completely different sequence, putting the customer's name first, the model number second, quantity third, etc. The rearranging for storage purposes can be easily accomplished by displaying the image of the original document on display 26, touching the customer's name and saying, e.g., "store", then touching the model number and repeating "store", etc., in the desired order.

It is particularly useful with graphic displays to be able to enlarge selected portions of the displays so that they can more easily be seen, within the limits of resolution of the equipment, and this is also useful with text because smaller portions thereof can be more easily identified.

Figure 2:
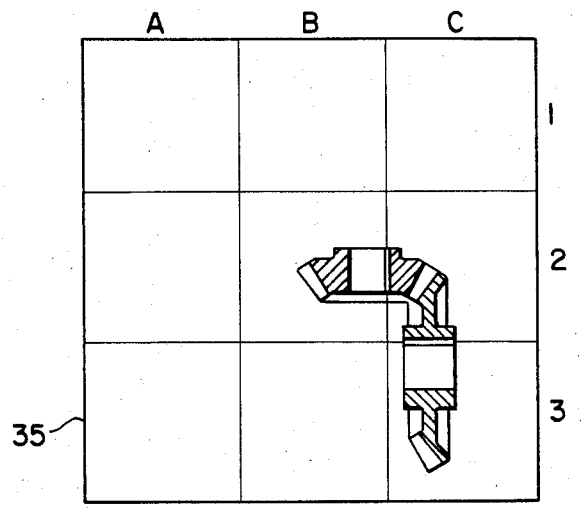
Figure 3:
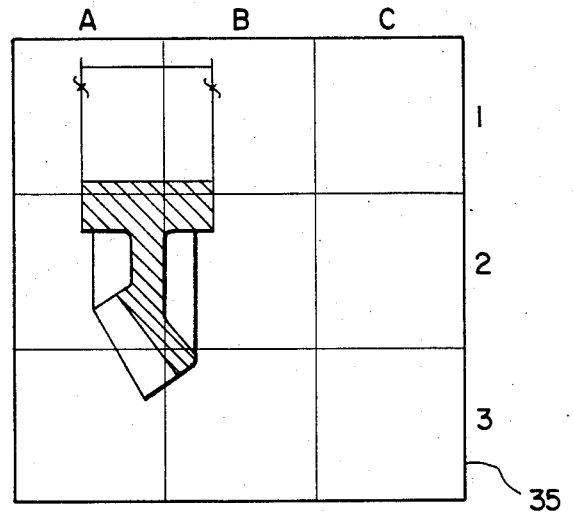
Figure 4:
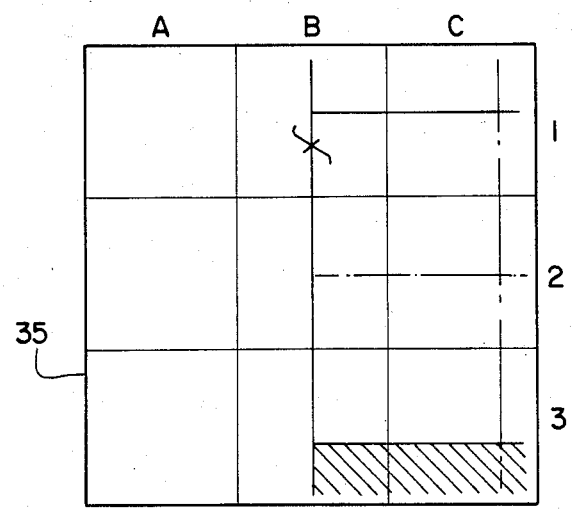

Accordingly, the invention contemplates the use of a grid system as illustrated in FIGS. 2, 3 and 4. As seen in FIG. 2, an image appears on the screen which is shown in a simplified form as a square 35. Vertical and horizontal lines are provided on the screen, either in a permanent form on the exterior of the screen or by video line generators, the vertical and horizontal columns and rows being identified by alphanumeric symbols as illustrated in FIG. 2. It will be assumed that the operator wishes to enlarge that portion of the image displayed in FIG. 2 which is in the square C3. It is necessary only for the operator to say "C, 3, full screen", this utterance being interpreted as an instruction to enlarge C3 to occupy the entire screen as illustrated in FIG. 3. The process can be repeated by the operator saying "A, 1, full screen" whereupon the material shown in square A1 is enlarged to occupy substantially the entire screen as shown in FIG. 4. That portion can then be stored or, alternatively, a segment thereof can be stored by the operator saying "B, 2, store".

It will be recognized that these instructions are merely examples and that other forms of code words can be used, the only requirement being that a suitable comparison dictionary be established.

Movement of a cursor is much more rapid and other forms of examination and activity are similarly more rapid using this technique than a keystroke technique.

The operation of the system can further be understood by carrying the system further in its intended use. A major purpose is to permit access by selected individual to the images of the documents which have been saved in store 30. Assume, for purposes of example, that a person in a decision-making capacity is supplied with a display screen 40 having a buffer memory 42 which is bidirectionally connected on a cable 43 to store 30. The individual 44 is supplied with a microphone 46, a speech recognition unit 48 and a location and instruction assembler 50 which is connected to buffer 42. Upon command, those documents designated for individual 44 by whatever code is used within the organization, is called upon from store 30 to buffer 42 and is available for simultaneous or sequential display. With a simple group of instructions, the individual 44 can instruct disposition of the various documents by ordering that the particular documents either be returned to store with no action, transmitted to another individual within the organization, transmitted to someone outside of the organization, or other action taken. Addresses can be referred to by the sectors identified as illustrated in FIGS. 2, 3 and 4, the actual number of divisions on the screen normally being somewhat larger than that shown in FIGS. 2–4.

The system illustrated in FIG. 1 is also useful for correction of text or, to a more limited extent, addition of data. As will be seen from the previously identified co-pending application, a further function performed by operator 32 in viewing the digitized text before encoding and storing is to add letters which were not recognized by reader 14 or to correct letters or other symbols which were not properly read. This is a function which can be performed more quickly by voice than with the conventional cursor keystroke controls by using an instruction such as "cursor jump to" followed by the location. For example, if the screen grid is divided into five sections by horizontal lines and four sections by vertical lines, a command "A1 cursor jump to B4" is capable of moving the cursor to a region which needs correction or addition much more expeditiously than with a keystroke system. Further refinement of the position can be accomplished by "left, right" commands or by keystroke. The cursor repositioning can also be accomplished by using the combination of touch and voice controls, e.g., by touching the cursor at its existing location, saying "jump to" and then touching the new location. Additions of text can be accomplished only within the limitations established by the size and preconditioning of the lexicon, although it will be apparent that letters and numbers can be added without difficulty since these will be fundamentally necessary symbols recognizable by recognition unit 36 or 48.

Figure 5:
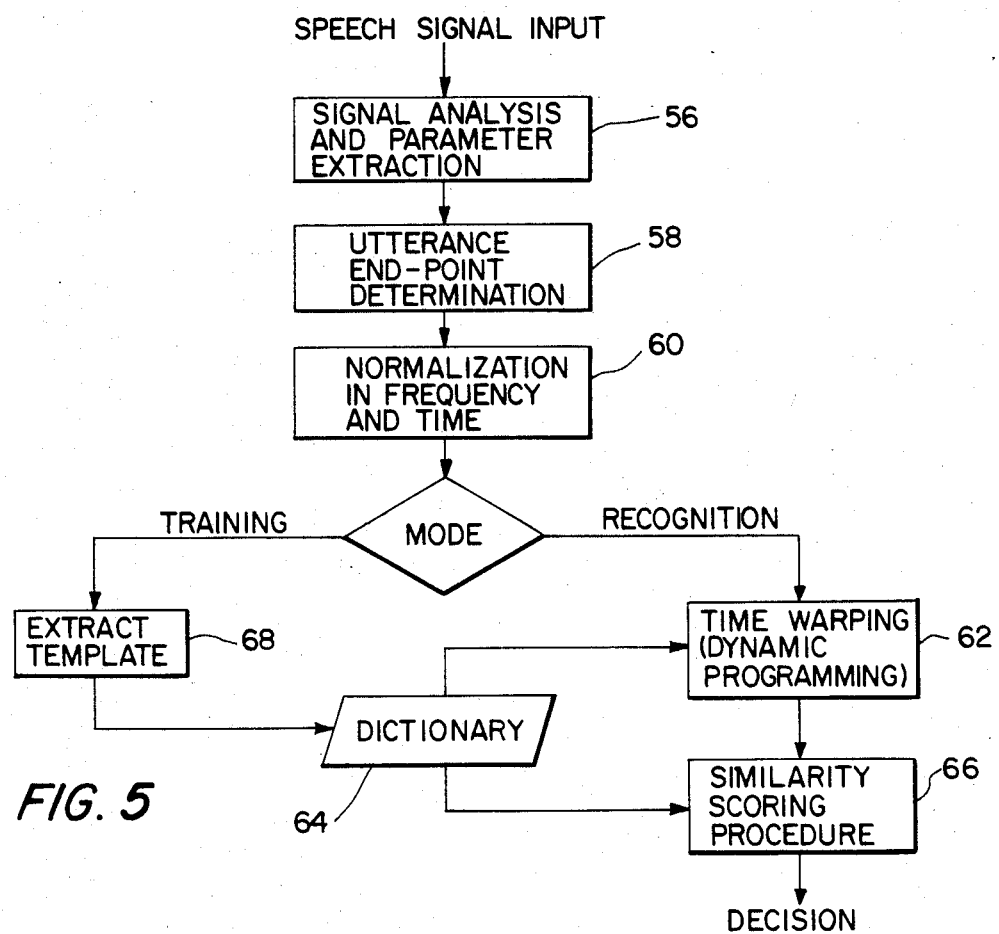

A typical speech recognition system is shown in FIG. 5 in which a speech signal input is received, in electrical form, from microphone 34 or 46. This signal is subjected to an analysis and pattern-matching process in which signal analysis and parameter extraction are accomplished in block 56. A major problem in speech recognition systems, generally speaking, is a recognition of the termination of each word. Thus, the next step 58 is utterance-end-point determination. Step 60 is normalization in frequency and time, after which, in the recognition mode, the signal is subjected to time warping which is a form of dynamic programming of which several examples exist. A dictionary 64 is provided with patterns of the utterances which the system is intended to recognize, and these patterns are compared with the processed speech signals, the extent of similarity being determined by a similarity scoring procedure 66. The resulting decision indicates whether or not an instruction or alphanumeric symbol is recognized and the suitable indication is given.

Such systems are normally caused to undergo a training mode in which the significant formants in the voice of the operator are recognized and stored as part of the dictionary, usually by averaging a significant number of repeated statements of the same expression, so that the system is subsequently capable of recognizing terms spoken by the same individual. A very high rate of accuracy is obtainable with a limited vocabulary spoken by the same individual, the degree of precision decreasing with other individuals.

The combination of voice and touch, or voice alone, can also be used to produce graphical illustrations on the display screen. As will be apparent, the production of "drawings" on a display screen with a keyboard input alone requires considerable familiarity with the specific computer and the programming language. With voice alone, or with voice supplemented by a touch responsive screen, much of the learning is eliminated. The operator can be essentially untrained in the operation of the machine except for learning a small vocabulary of instruction words.

As an example, assume that a line is to be drawn between two points. It is only required that the operator touch the points and utter the instruction word which has been defined in the dictionary to mean "line". The touches and instruction provide all of the information which is normally entered on a keyboard, i.e., the end points in a Cartesian coordinate system and an instruction to draw a line, in a relatively large number of keystrokes. It is important to note that no changes would usually be required in the basic program of the machine. The programs for graphics purposes normally recognize an instruction which involves a small number of input words. These words are supplied by the assembler, which is necessarily tailored to the computer language and operating system, in response to the spoken command.

More sophisticated diagrams than a line, of course, can be drawn with nearly equal ease. Two points and a "circle" instruction can be used to define the center and radius of a circle, and portions can be erased by defining the same kinds of limits. This approach thus requires somewhat less skill than with a keyboard alone.

Figure 6:
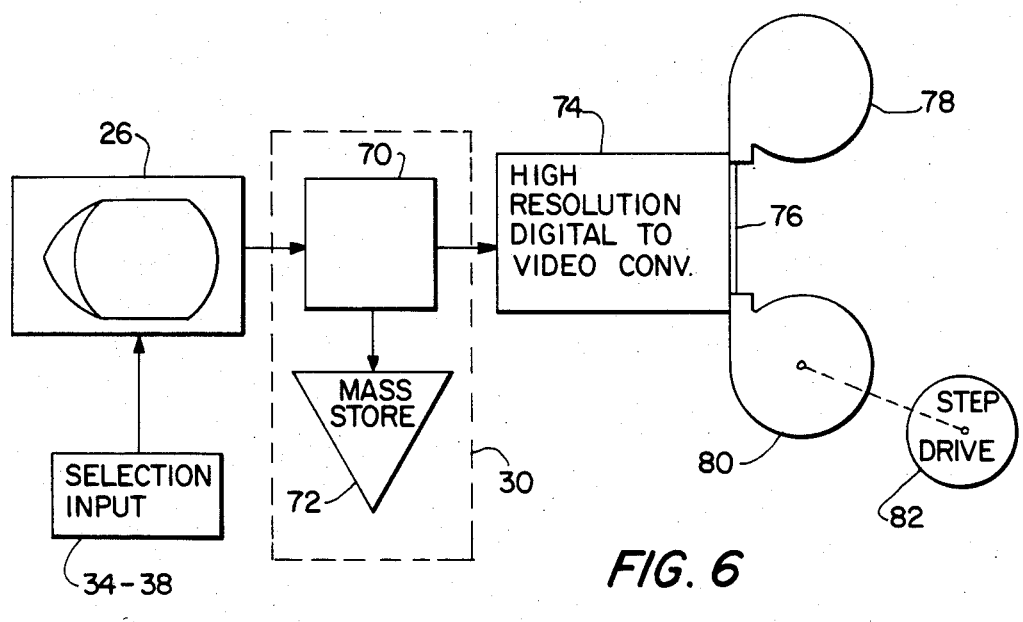

FIG. 6 illustrates a further aspect of the invention in which the selection and encoding process can further be used for enhanced microform storage. The selection accomplished by the portions of the system shown in FIG. 1 are shown again in FIG. 6 with the encoder and storage 30 separated into an encoder 70 and a mass store 72. As a security supplement or as an alternative to source document storage 20, and as a redundant storage technique to mass store 72, it is desirable to provide a microfilm or microform record of the significant portions of received documents. For this purpose, the encoded signals are supplied to a high resolution digital to video converter 74 which is, in essence, a reverse video camera, capable of accepting digital signals and producing high resolution images which can be supplied through a conventional optical system to microfilm 76 delivered by a supply reel 78 to a take-up reel 80, driven in a well-known fashion by a step or intermittent drive 82. Although a reel type of film is illustrated, it will be recognized that this film can be any size and can be replaced by microfiche or microdot storage as well.

While certain advantageous embodiments have been chosen to illustrate the invention, it will be understood by those skilled in the art that various changes and modifications can be made therein without departing from the scope of the invention as defined in the appended claims.

What I claim is:

1. A method for using voice input to data processing machine of the type having a visual display screen and means for selectively displaying images on the screen comprising the steps of
   generating a set of visible dividers on the screen which segregate the screen into sectors which can be uniquely discribed by one or more alphanumeric symbols;
   providing a storage location for data bits from which a display is to be produced on the screen;
   functionally dividing the storage location into a plurality of storage portions at least equal in number to the number of sectors so that addresses in the storage location can be functionally correlated with the positions of image features displayed on the screen;
   providing a voice responsive transducer for converting received utterances into electrical signals representative of speech patterns;
   storing a dictionary of speech patterns of a plurality of utterances including utterances recognizable as the alphanumeric symbols identifying the sectors and preselected instructions;
   providing the display screen with touch responsive means so that touching the screen identifies a location to the machine, whereby utterances can be employed in conjunction with touch to efect display changes;
   comparing the speech patterns of an utterance received by the transducer with the patterns stored in the dictionary and producing outputs of recognized utterances as an instruction or a sector identification followed by an instruction, recognition being defined as a close match of patterns; and
   executing the instruction.

2. A method according to claim 1, wherein the stored dictionary includes a pattern recognizable as an instruction to enlarge an identified sector to fill the viewable screen area, the instruction being repeatable to accomplish multiple enlargements.

3. A method according to claim 1, wherein the stored dictionary includes a pattern recognizable as an instruction to delete and replace characters appearing on the screen.

4. A method according to claim 1, wherein the stored dictionary includes a pattern recognizable as an instruction to change the location of a cursor on the screen from one sector to another.

5. A method according to claim 1, wherein the stored dictionary includes a pattern recognizable as an instruction to adjust the location of the entire image horizontally or vertically on the screen.

6. A method according to claim 1 and including providing a keyboard for entering selected data and instructions by keystroke in addition to voice.

7. A method according to claim 1 and including providing an encoding device for converting the digital representation of the displayed image into a machine code,
   supplying the machine code to a high resolution digital-to-video converter and forming an optical image of the displayed image, and
   projecting the optical image at reduced size onto film for microform storage.

8. A method according to claim 7 including providing the display screen with touch responsive means so that touching the screen identifies a location to the machine, whereby utterances can be employed in conjunction with touch to effect display changes.

* * * * *